(12) United States Patent
Kao

(10) Patent No.: US 6,942,195 B2
(45) Date of Patent: Sep. 13, 2005

(54) VALVE FOR A WATER FAUCET

(76) Inventor: Chih-Hung Kao, 5F, No. 118, Sec. 2, Muhsin Rd., Wenshan Dist., Taipei (TW)

( * ) Notice: Subject to any disclaimer, the term of this patent is extended or adjusted under 35 U.S.C. 154(b) by 58 days.

(21) Appl. No.: 10/751,911

(22) Filed: Jan. 7, 2004

(65) Prior Publication Data
US 2005/0145819 A1    Jul. 7, 2005

(51) Int. Cl.[7] ............................................ F16K 31/00
(52) U.S. Cl. ...................... 251/339; 251/230; 251/319
(58) Field of Search .............................. 251/230, 319, 251/339

(56) References Cited

U.S. PATENT DOCUMENTS

| 4,456,222 A | * | 6/1984 | Shen ........................... 251/230 |
| 5,704,397 A | * | 1/1998 | Lu ........................... 137/630.15 |
| 6,131,608 A | * | 10/2000 | Lu ................................ 137/550 |

* cited by examiner

Primary Examiner—Edward K. Look
Assistant Examiner—John K. Fristoe, Jr.
(74) Attorney, Agent, or Firm—Dennison, Schultz, Dougherty & MacDonald

(57) ABSTRACT

A valve for a water faucet includes a barrel, a valve core received in the barrel, and a bottom cap mounted in the barrel and under the valve core. The valve core has a disk with multiple first ribs formed at an inner wall of a hole thereof. Each of the first ribs has a first bevel edge formed at a top thereof. An outer rod has multiple ratchets formed at a top thereof and a circumferential position offset between corresponding first bevel edges and ratchets. Multiple first lugs are formed at an outer periphery of the outer rod. The inner rod has multiple second lugs corresponding to the first lugs. Each of the second lugs has a second bevel edge for abutting the ratchet and the first bevel edge. The spindle extends through an inlet of the barrel and has a head for blocking an inlet of the barrel.

9 Claims, 9 Drawing Sheets

VALVE FOR A WATER FAUCET

BACKGROUND OF THE INVENTION

1. Field of the Invention

The present invention relates to a valve for a water faucet, and more particularly to a valve which is operated by a pushing rod installed under a water outlet.

2. Description of Related Art

A water faucet is generally provided with knobs for turning on/off the water faucet. The knobs of the water faucet often become contaminated by detergents, toners, bacteria and the like. When a person's hands have become dirty and they wish wash them clean, the knobs of the water faucets that are manually turned on by the user's dirty hands become dirty themselves. After the user has cleaned his dirty hands and proceeds to manually turn off the water faucets, the user's clean hands become dirty again.

Furthermore, the person often lathers the hands during cleaning, so the knobs will be contaminated by the lather when the person manually turns on the knobs again for rinsing off the hands. Thus, the user needs to wash the knobs by water collected in both hands, which is very inconvenient for the user. Furthermore, repeated such washing of the knobs over a long period of time wastes a lot of water.

For resolving the problem, the water faucet can be assembled with an infrared induced device as a controller to turn on/off the water faucet. When the user's hands come close to the water faucet, the infrared induced device will turn on the water faucet to discharge water. By using this device, the water faucet can be automatically operated without physical contact to prevent the cleaned hands from being contaminated. However, the infrared device has a high cost.

Therefore, the invention provides a valve for a water faucet to mitigate or obviate the aforementioned problems.

SUMMARY OF THE INVENTION

The main objective of the present invention is to provide a valve for a water faucet which is operated by pushing upwards an outer rod under a water outlet of the water faucet to prevent cleaned hands from being contaminated.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
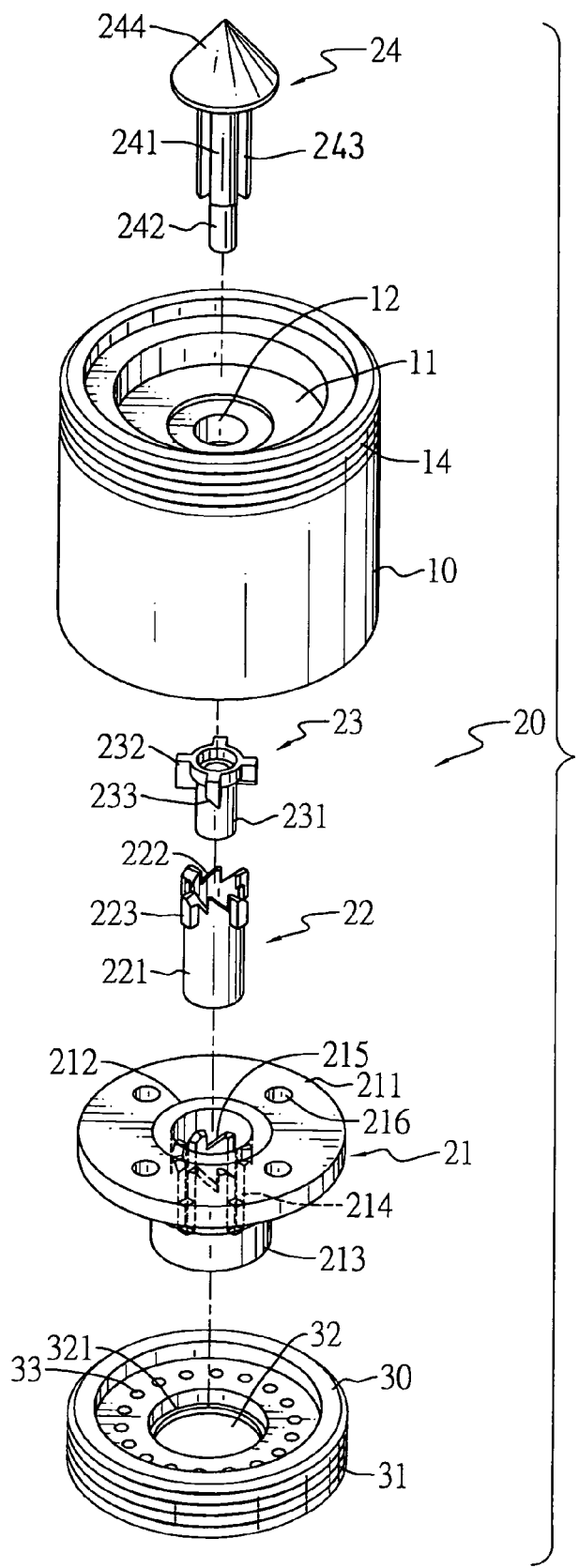
FIG. 1 is an exploded perspective view of a valve in accordance with the present invention.
Figure 2:
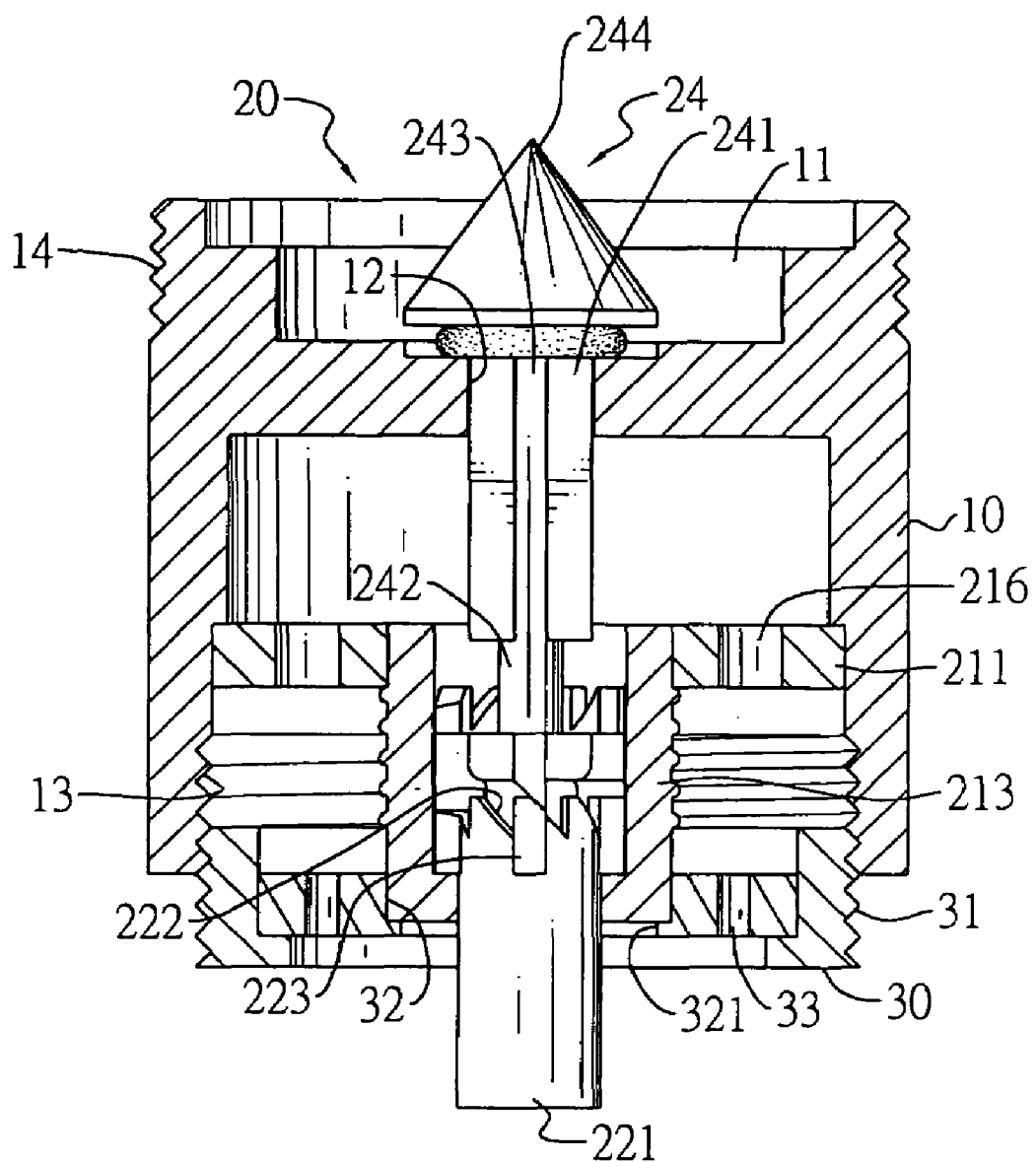
FIG. 2 is a cross sectional view of the valve in accordance with the present invention.

With reference to FIGS. 1–2, a valve for a water faucet in accordance with the present invention is composed of a barrel (10), a valve core (20), and a bottom cap (30).

The barrel (10) has a closed upper end (not numbered) and an open lower end (not numbered). A recess (11) is defined at the upper end of the barrel (10), and an inlet (12) is axially defined in the center of the recess (11). An internal thread (13) is defined at an inner wall of the barrel (10) at the lower end, and a first external thread (14) is defined at an outer periphery of the barrel (10) at the upper end.

The valve core (20) positioned in the barrel (10) is composed of a seat (21), an outer rod (22), an inner rod (23) and a spindle (24).

The seat (21) has a disk (211) received in the barrel (10) from the lower end. A hole (212) is defined through the center of the disk (211), and a tube (213) is engaged in the hole (212) to position under the disk (211). Multiple apertures (216) are defined around the hole (212). Multiple first ribs (not numbered) are evenly and longitudinally formed at an inner wall of the tube (213), and multiple channels (214) are respectively and longitudinally defined between each two adjacent first ribs. In this embodiment, four first ribs and four channels (214) are alternately formed on the inner wall of the tube (213). Each of the first ribs has a first bevel edge (215) formed at a top end thereof.

The outer rod (22) has a first tubular part (221) inserted in the tube (213). Multiple ratchets (222) are formed at an upper end of the outer rod (22) with the same bevel as the first bevel edges (215). The outer rod (22) has a circumferential position offset between corresponding ratchets (22) and the first bevel edges (215). Multiple first lugs (223) are evenly and separately formed at an outer periphery of the outer rod (22) at the upper end. In this embodiment, four first lugs (223) are formed on the outer rod (22) and respectively located in the channels (214), so the outer rod (22) can be axially moved upwards and downwards in the tube (213).

The inner rod (23) has a second tubular part (231) inserted in the outer rod (22). Multiple second lugs (232) are evenly and separately formed at an outer periphery of an upper end of the inner rod (23). In this embodiment, four second lugs (232) are formed on the inner rod (23) and each have a second bevel edge (233) with the same bevel as the ratchet (222) and the first bevel edge (215) and formed at a bottom of the respective second lugs (232). The second lugs (232) can be located in the channels (214), and the second bevel edges (233) can abut the ratchets (222) and the first bevel edges (215).

The spindle (24) has an upper segment (241) extending through the inlet (12), and a lower segment (242) with a smaller diameter than the upper segment and inserted in the second tubular part (231). Multiple second ribs (243) are evenly and separately formed at an outer periphery of the upper segment (241) of the spindle (24). In this embodiment, four second ribs (243) are formed on the spindle (24) and respectively located in the channels (214). A head (244) is formed at a top end of the spindle (24) for blocking the inlet (12). A washer (not numbered) is provided outside the upper segment (241) and between the head (244) and the inlet (12).

The bottom cap (30) is fastened in the barrel (10) by a second external thread (31) at an outer periphery thereof engaged with the internal thread (13) of the barrel (10). A variety of commonly-found methods may be employed to secure the bottom cap (30) in the barrel (10), but in this embodiment shrink-fitting is preferred. An opening (32) is defined through the bottom cap (30) and the tube (213) extends through the opening (32). A flange (321) is formed at a bottom of the opening (32) to support the tube (213). Multiple outlets (33) are defined around the opening (32).

Figure 3:
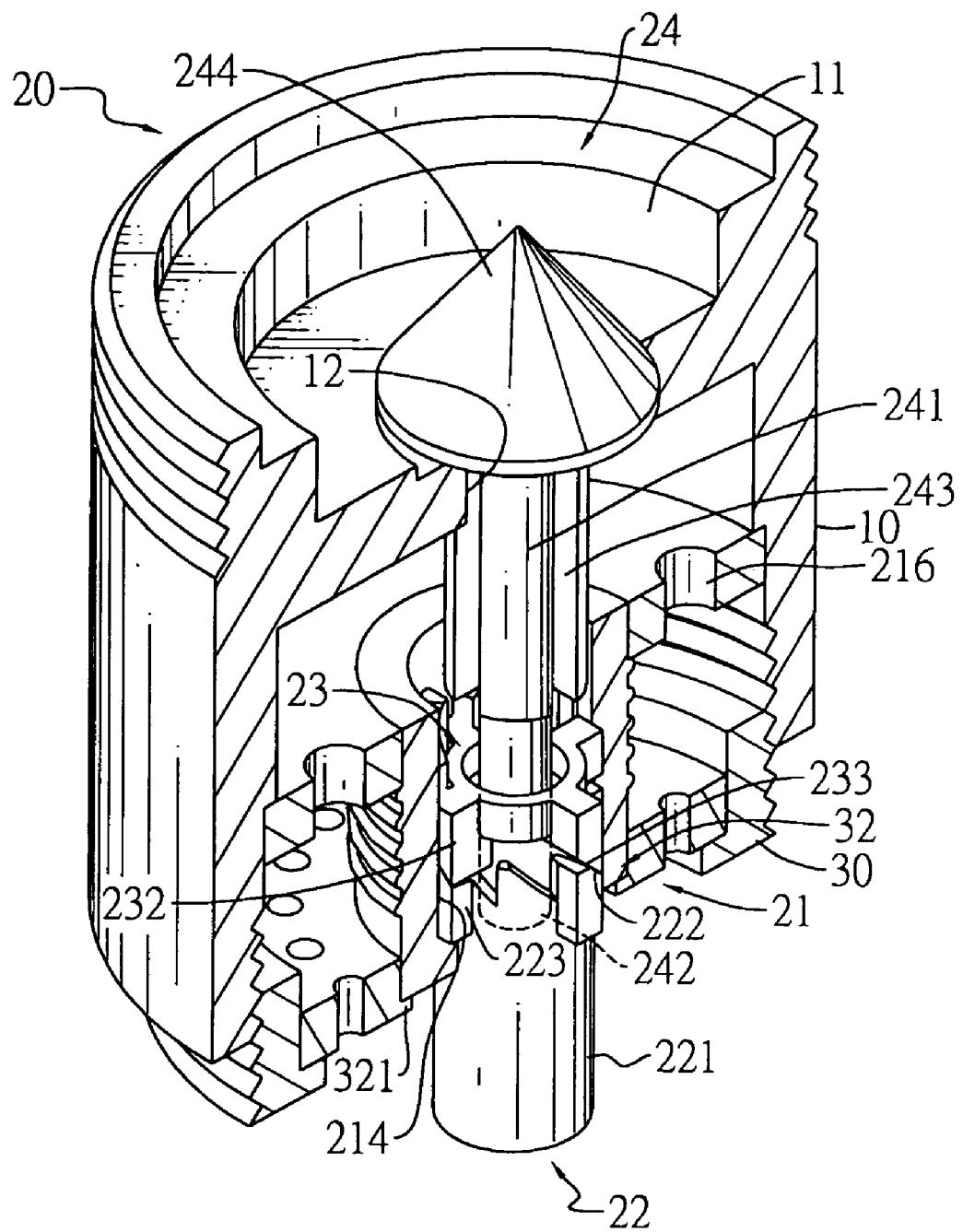
FIG. 3 is a schematically perspective view of the valve in accordance with the present invention.

With reference to FIGS. 2–3, in assembly, the first tubular part (221) of the outer rod (22) is inserted in the tube (213) to position the first lugs (223) in the respective channels (214). The second tubular part (231) of the inner rod (23) is inserted in the outer rod (22), and the second lugs (232) are aligned with the first lugs (223) and positioned in the respective channels (214). The second bevel edges (233) respectively abut the corresponding ratchets (222) of the outer rod (22). Then, the seat (21) is received in the barrel (10), and the bottom cap (30) is fastened at the lower end of the barrel (10) to securely mount the seat (21) in the barrel (10). Thereafter, the spindle (24) is inserted in the barrel (10) through the inlet (12) with the lower segment (242) positioned in the second tubular part (231).

Figure 4:
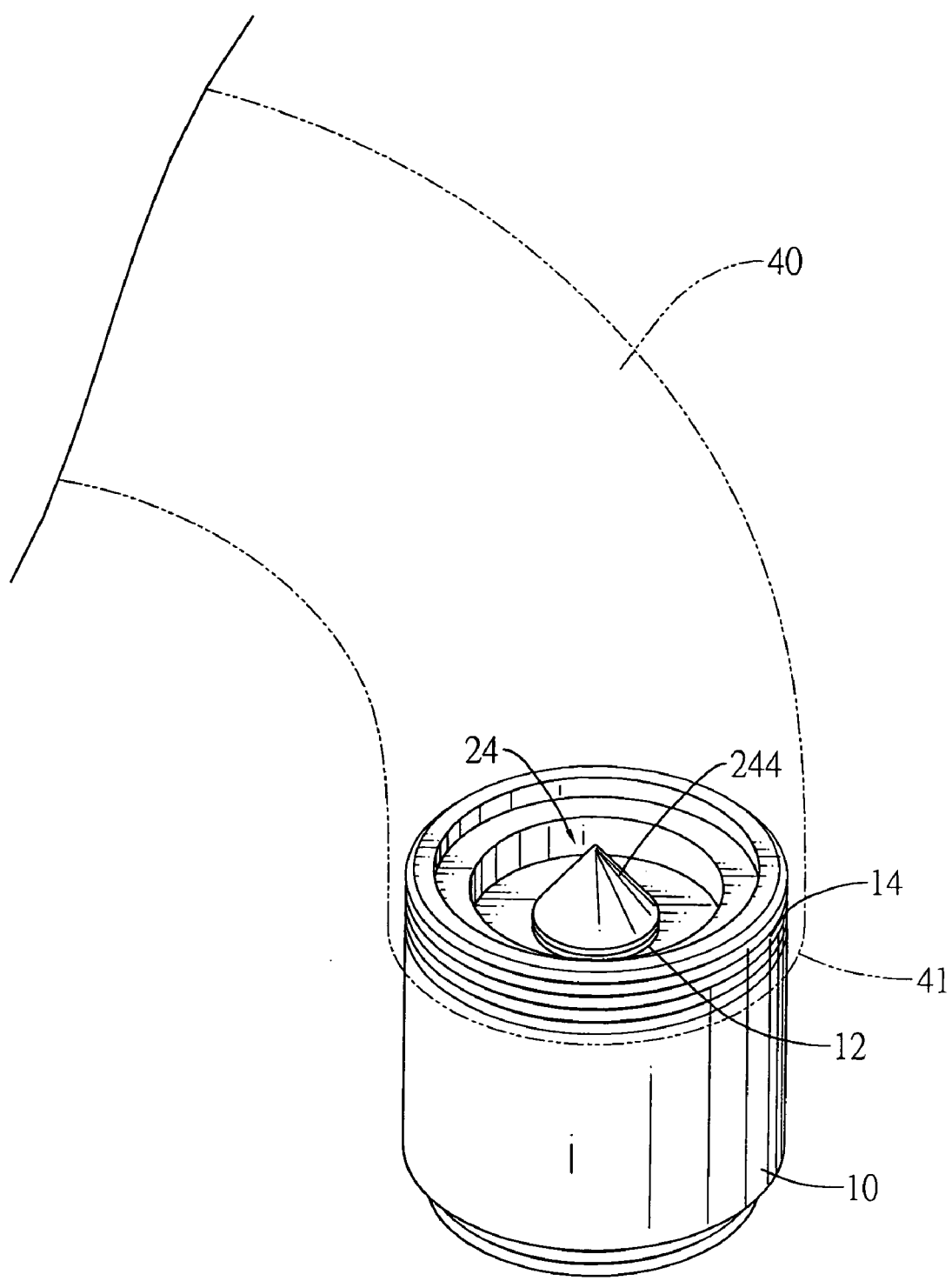
FIG. 4 is a schematic view of the valve installed in a water faucet.

With reference to FIG. 4, the valve can be threadingly installed in a water outlet (41) of a water faucet (40) by the first external thread (14) of the barrel (10). In a closed status, the inlet (12) of the barrel (10) is blocked by the head (244) of the spindle (24).

Figure 5:
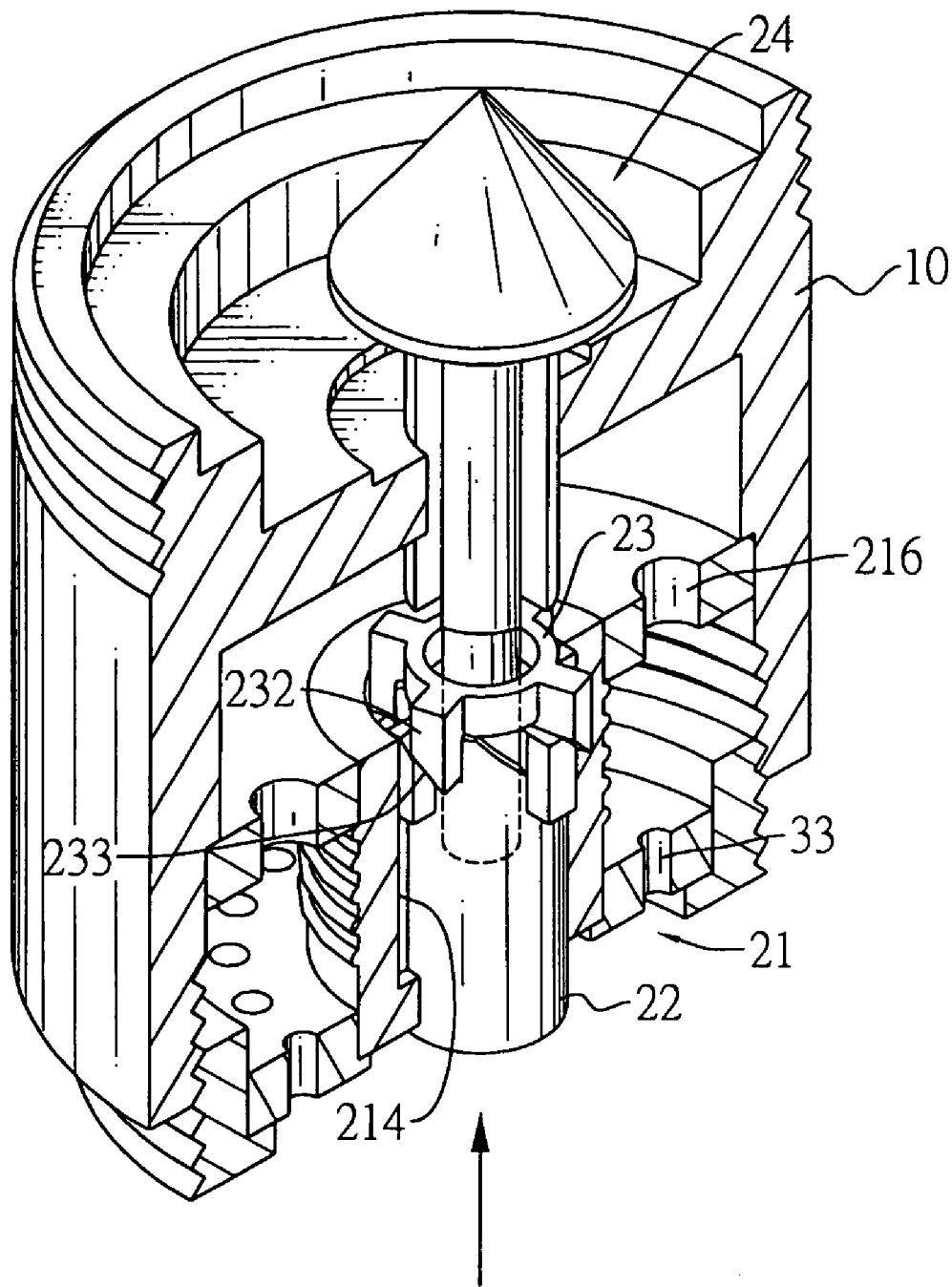
FIG. 5 is a schematically perspective view of the valve in a status of an outer rod being pushed upwards.
Figure 6:
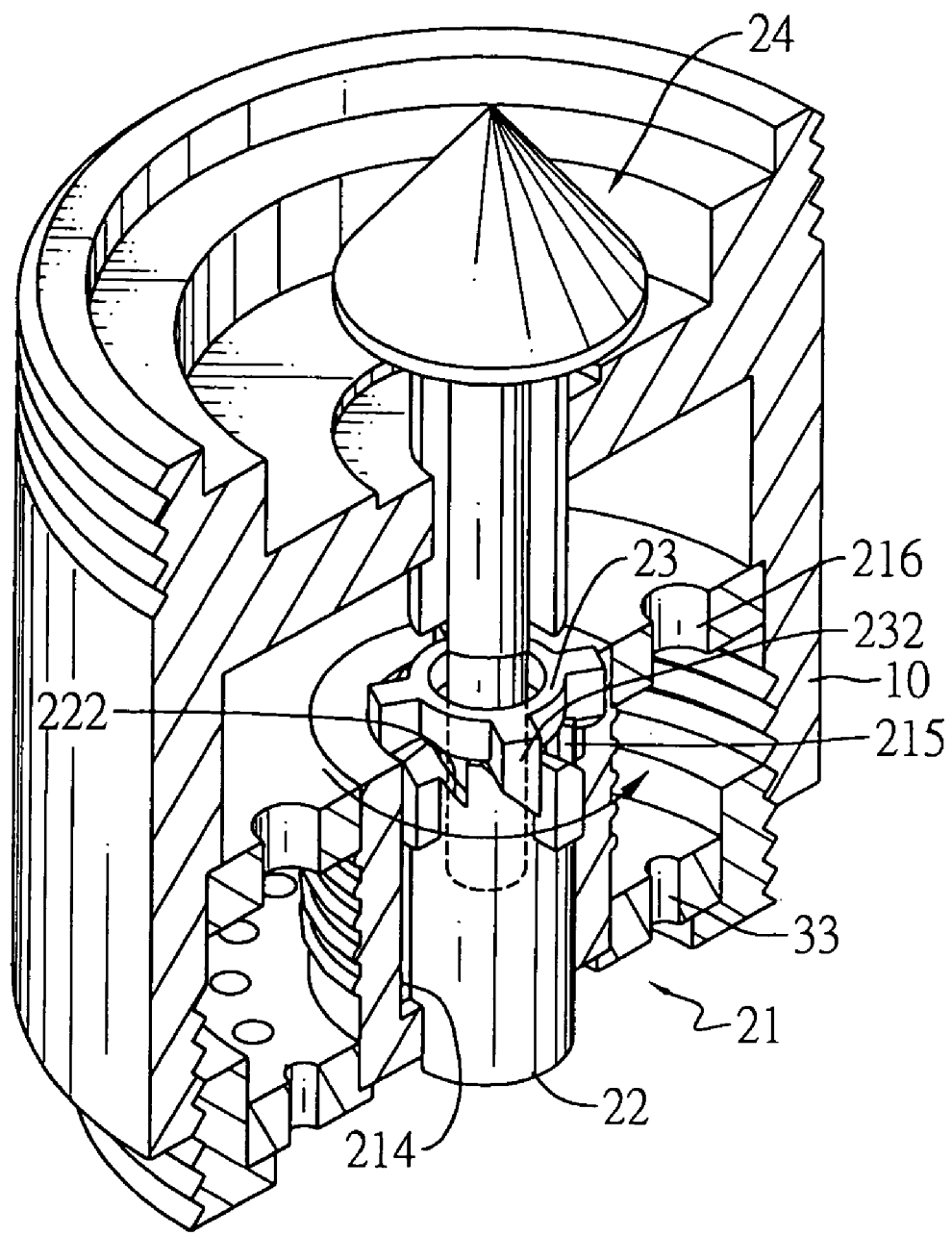
FIG. 6 is a schematically perspective view of the valve in a status of an inner rod being rotated.

In use, with reference to FIGS. 1 and 5, when a user wants to open the water faucet (40), the outer rod (22) is pushed upwards, and the inner rod (23) and the spindle (24) are pushed by the outer rod (22) to move upwards. When the second lugs (232) of the inner rod (23) are retracted from the channels (214), as illustrated in FIG. 6, the second lugs (232) can move along the corresponding ratchets (223) to rotate the inner rod (23). Thus, the second lugs (232) are moved to a position above the first bevel edges (215).

Figure 7:
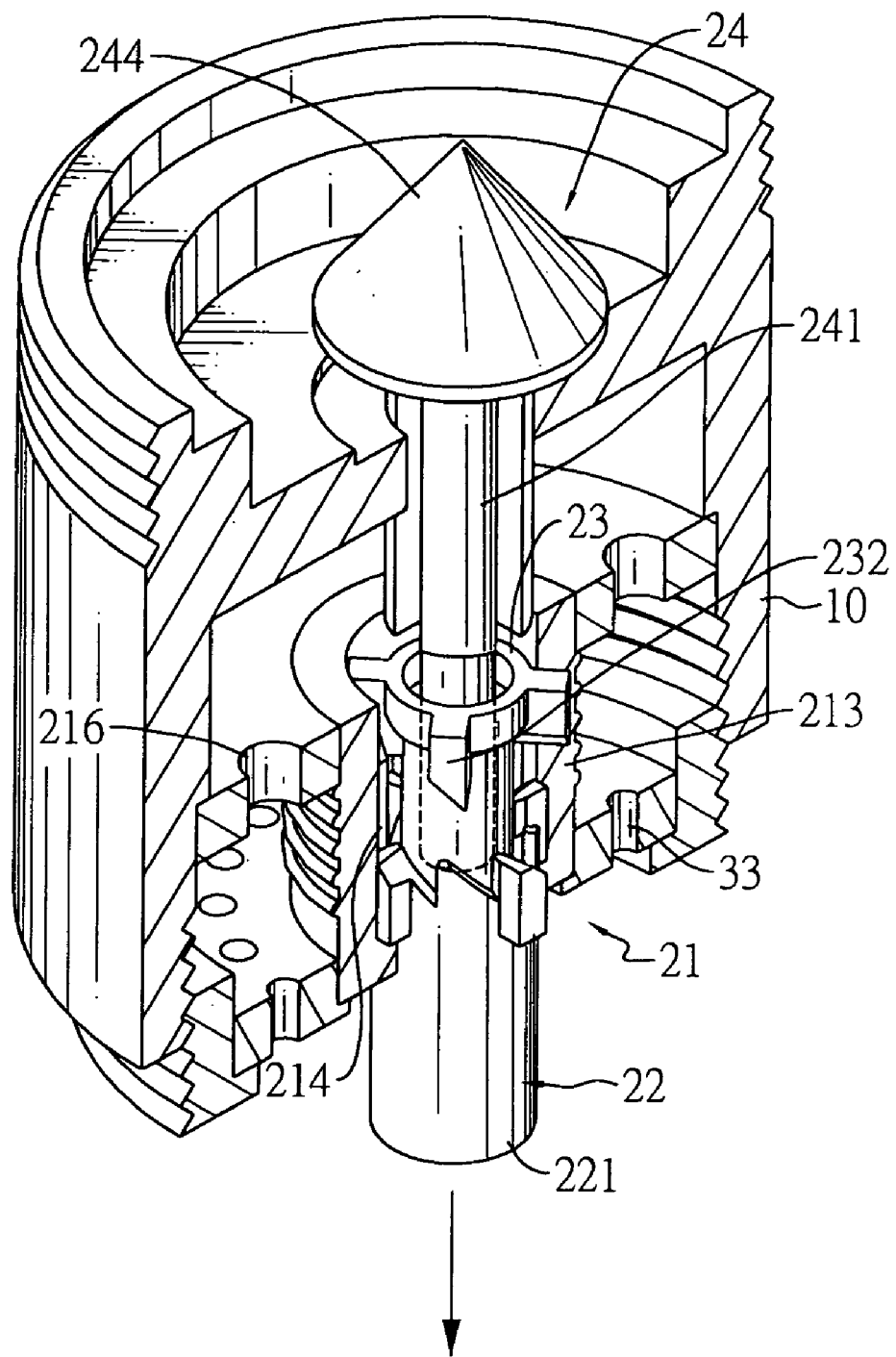
FIG. 7 is a schematically perspective view of the valve in a status of the outer rod being released and the inner rod and a spindle being stopped at a raised position.

When the user releases the outer rod (22), as shown in FIG. 7, the outer rod (22) falls down along the channels (214). When the second bevel edges (233) of the inner rod (23) abut the corresponding first bevel edges (215), the second lugs (232) can move along the first bevel edges (215), and the inner rod (23) is supported by the first ribs of the tube (213). Therefore, the spindle (24) is stopped at the high position to communicate the inlet (12) with the water faucet (40), so water can in turn flow through the inlet (12), the apertures (216), and be discharged out of from the outlet (33).

When the user wants to close the water faucet (40), the outer rod (22) is pushed upwards again, and the inner rod (23) and the spindle (24) are pushed upwards by the outer rod (22). When the second lugs (232) of the inner rod (23) are retracted from the tube (21), the second lugs (232) can move along the ratchets (222) again to rotate the inner rod (23). Then, the second lugs (232) are disengaged from the first bevel edge (215), and respectively aligned with the channels (214).

When the user releases the outer rod (22), the inner rod (23) and the spindle (24) can move along the channels (214) and fall down to block the inlet (12) with the head (244) again, so the water faucet (40) is turned off.

Figure 8:
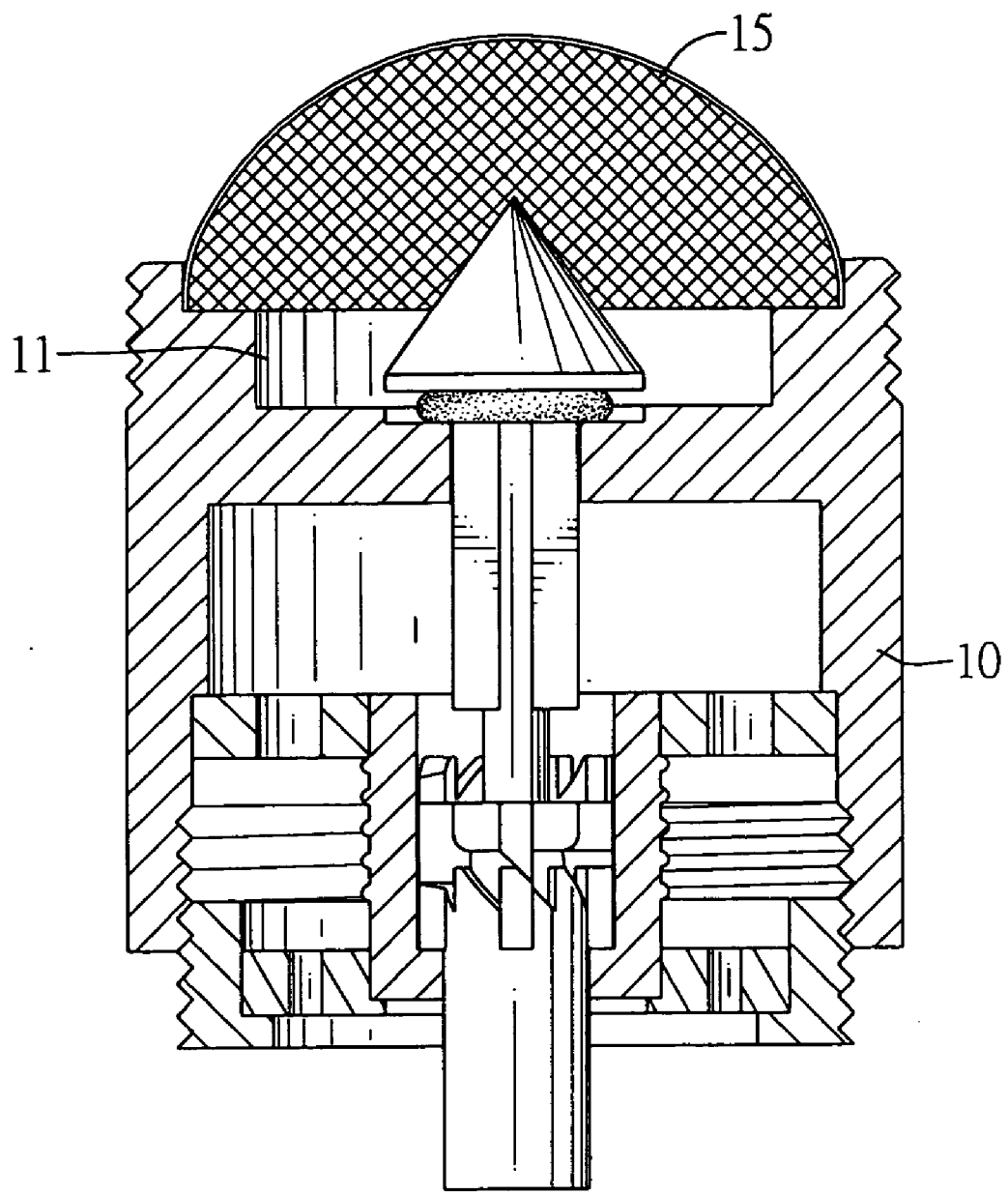
FIG. 8 is a cross sectional view of another embodiment of the valve in accordance with the invention.

With reference to FIG. 8, the valve further has a mesh (15) mounted in the recess (11) for filtering water.

Figure 9:
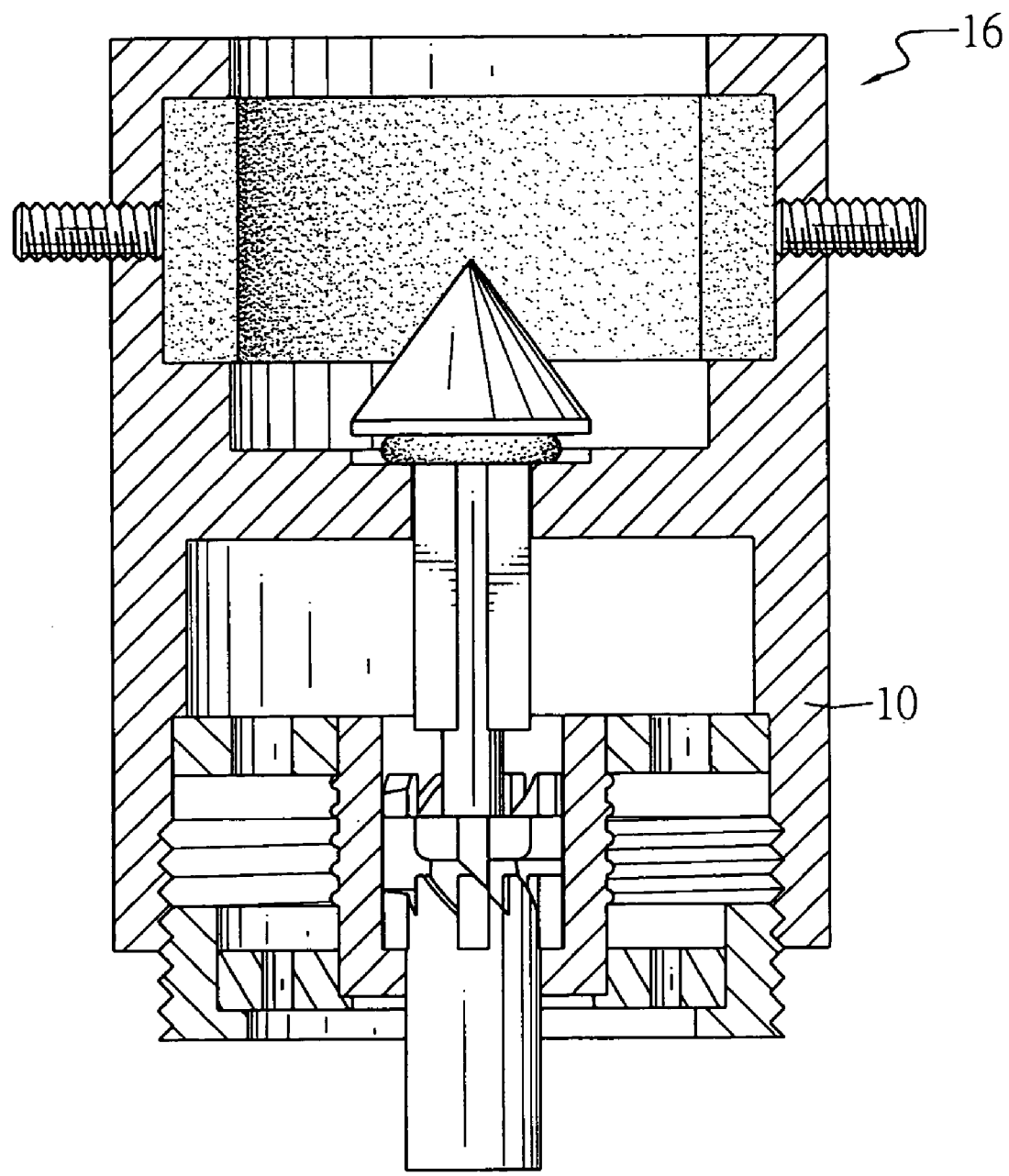
FIG. 9 is a cross sectional view of a third embodiment of the valve in accordance with the invention.

According to another embodiment as illustrated in FIG. 9, the barrel (10') has an upper tubular part (16) formed at the top end thereof. The water outlet of the water faucet is received in the upper tubular part (16) of the barrel (10') and secured by screws (not numbered) radially extended through the upper tubular part (16).

Therefore, when the water faucet is assembled with the valve of the present invention, the user's lathered hands can push the outer rod (22) upwards to turn on the water faucet, and water flowing through the outer rod (22) can rinse the user's hands and the contaminated outer rod (22) itself. Thus, the user's cleaned hands will not become dirty when the user pushes the outer rod (22) again to turn off the water faucet.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A valve for a water faucet comprising:
    a barrel having a closed upper end, an open lower end, an inlet defined at the upper end and axially through the barrel;
    a valve core positioned in the barrel and having
        a seat having a disk received in the barrel from the open lower end, a hole defined through the disk, multiple holes defined around the hole; a tube inserted through the hole, multiple first ribs evenly and separately formed at an inner wall of the tube, multiple channels respectively defined between adjacent first ribs, multiple first bevel edges respectively formed at the top ends of the first ribs;
        an outer rod having a first tubular part extending in the tube, multiple ratchets formed at an upper end of the outer rod with the same bevel as the first bevel edges and a circumferential position offset between corresponding ratchets and bevel edges, and multiple first lugs formed at an outer periphery of the outer rod and respectively located in the channels;
        an inner rod having a second tubular part extending in the outer rod, multiple second lugs formed at an outer periphery of the inner rod for corresponding to the first lugs, and each second lug having a second bevel edge formed at a bottom of the second lug and with the same bevel configuration as the ratchet and the first bevel edge; and
        a spindle having a lower segment inserted in the inner rod, an upper segment extending through the inlet, multiple second ribs formed at an outer periphery of the upper segment, and a head formed at a top end of the spindle for blocking the inlet; and
    a bottom cap mounted in the barrel and beneath the seat and having an opening defined through the bottom cap for receiving the tube of the seat, and multiple outlets defined around the opening.

2. The valve as claimed in claim 1, wherein the outer rod has four first ribs evenly formed at the inner wall of the outer rod, and four channels are respectively defined between the four first ribs.

3. The valve as claimed in claim 1, wherein the barrel has a recess defined at the upper end, and a mesh mounted in the recess.

4. The valve as claimed in claim 1, wherein the barrel has an upper tubular part formed at the upper end of the barrel.

5. The valve as claimed in claim 1, wherein the spindle has a washer provided outside the upper segment and between the head and the inlet.

6. The valve as claimed in claim 1, wherein the bottom cap has a flange formed at a bottom of the opening for supporting the tube.

7. The valve as claimed in claim 1, wherein the barrel has a first external thread formed at the upper end of the barrel.

8. The valve as claimed in claim 1, wherein the barrel has an internal thread formed at the lower end of the barrel, and the bottom cap has a second external thread formed at an outer periphery and engaged with the internal thread.

9. The valve as claimed in 1, wherein the bottom cap is securely mounted in the barrel by means of shrink fit.

* * * * *